(12) United States Patent
Itskovich et al.

(10) Patent No.: US 7,612,567 B2
(45) Date of Patent: *Nov. 3, 2009

(54) TWO-AXIAL PAD FORMATION RESISTIVITY IMAGER

(75) Inventors: Gregory B. Itskovich, Houston, TX (US); Randy Gold, Houston, TX (US); Alexandre N. Bespalov, Spring, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,792

(22) Filed: Apr. 28, 2008

(65) Prior Publication Data

US 2008/0278171 A1 Nov. 13, 2008

Related U.S. Application Data (63) Continuation-in-part of application No. 11/321,132, filed on Dec. 29, 2005, now Pat. No. 7,365,545.

(51) Int. Cl.
*G01V 3/20* (2006.01)
(52) U.S. Cl. ...................... 324/367; 324/371
(58) Field of Classification Search ......... 324/373–375, 324/367, 355, 347, 371, 366
See application file for complete search history.

(56) References Cited

U.S. PATENT DOCUMENTS

| | | | |
|---|---|---|---|
| 2,930,969 A | 3/1960 | Baker | |
| 3,365,658 A | 1/1968 | Birdwell | |
| 4,122,387 A | 10/1978 | Ajam et al. | |
| 4,468,623 A | 8/1984 | Gianzero et al. | |
| 5,502,686 A | 3/1996 | Dory et al. | |
| 5,677,631 A | 10/1997 | Reittinger et al. | |
| 6,188,222 B1 | 2/2001 | Seydoux et al. | |
| 6,191,588 B1 | 2/2001 | Chen | |
| 6,348,796 B2 | 2/2002 | Evans et al. | |
| 6,405,136 B1 | 6/2002 | Li et al. | |
| 6,476,609 B1 | 11/2002 | Bittar | |
| 6,600,321 B2 | 7/2003 | Evans | |
| 6,714,014 B2 | 3/2004 | Evans et al. | |
| 6,801,039 B2 | 10/2004 | Fabris et al. | |
| 6,809,521 B2 | 10/2004 | Tabarovsky et al. | |
| 7,365,545 B2 * | 4/2008 | Itskovich et al. | 324/367 |
| 2003/0164705 A1 | 9/2003 | Cheung et al. | |
| 2003/0173968 A1 | 9/2003 | Cheung et al. | |
| 2003/0222651 A1 | 12/2003 | Tabanou | |
| 2004/0051531 A1 | 3/2004 | Chemali et al. | |
| 2005/0001624 A1 | 1/2005 | Ritter et al. | |
| 2005/0134279 A1 | 6/2005 | Hu et al. | |
| 2005/0134280 A1 | 6/2005 | Bittar et al. | |
| 2005/0218898 A1 | 10/2005 | Fredette et al. | |
| 2005/0242819 A1 | 11/2005 | Gold et al. | |
| 2005/0253589 A1 | 11/2005 | Fabris et al. | |

FOREIGN PATENT DOCUMENTS

CA 685727 5/1960

\* cited by examiner

*Primary Examiner*—Reena Aurora
(74) *Attorney, Agent, or Firm*—Madan & Sriram, P.C.

(57) ABSTRACT

A resistivity imaging device injects currents in two orthogonal directions using two pairs of return electrodes and performing impedance measurements of the buttons placed between the returns.

21 Claims, 5 Drawing Sheets

TWO-AXIAL PAD FORMATION RESISTIVITY IMAGER

CROSS-REFERENCES TO RELATED APPLICATIONS

This application is a continuation-in-part of U.S. patent application Ser. No. 11/321,132, now U.S. Pat. No. 7,365,545.

1. FIELD OF THE INVENTION

This invention generally relates to exploration for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the voltage source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, U.S. Pat. No. 5,502,686 to Dory et al. and U.S. Pat. No. 6,714,014 to Evans.

SUMMARY OF THE INVENTION

One embodiment of the invention is an apparatus for evaluating an earth formation. The apparatus includes at least one pad extendable from a body of a logging tool conveyed in the borehole. A first electrode on the pad is configured to convey a current into the earth formation. A return electrode is horizontally displaced from the first electrode. At least one processor is configured to select a frequency of the current using a resistivity of a borehole fluid and (II) a permittivity of the borehole fluid, determine a resistivity property of the earth formation from the current in the first electrode and a voltage between the first electrode and the return electrode, and record the resistivity property on a suitable medium.

Another embodiment of the invention is a method of evaluating an earth formation. A current is conveyed into the formation using at least one pad-mounted current electrode at a frequency selected using a resistivity of a borehole fluid and a permittivity of the borehole fluid. Current is received in a return electrode horizontally separated from the current electrode. A resistivity property of the earth formation is determined from the current in the current electrode and a voltage between the current electrode and the return electrode.

Another embodiment of the invention is a computer readable medium for use with an apparatus which senses a resistivity parameter of an earth formation penetrated by a borehole. The apparatus includes a a pad-mounted current electrode configured to convey a current into the earth formation at a frequency selected based on a resistivity of a borehole fluid and a permittivity of the borehole fluid. The apparatus also includes a return electrode horizontally displaced from the current electrode. The medium includes instructions which enables a processor to estimate the resistivity parameter based on currents in the current electrode and a voltage between the current electrode and the return electrode. The computer readable medium may be a ROM, an EPROM, an EAROM, a flash memory, and/or an optical disk

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
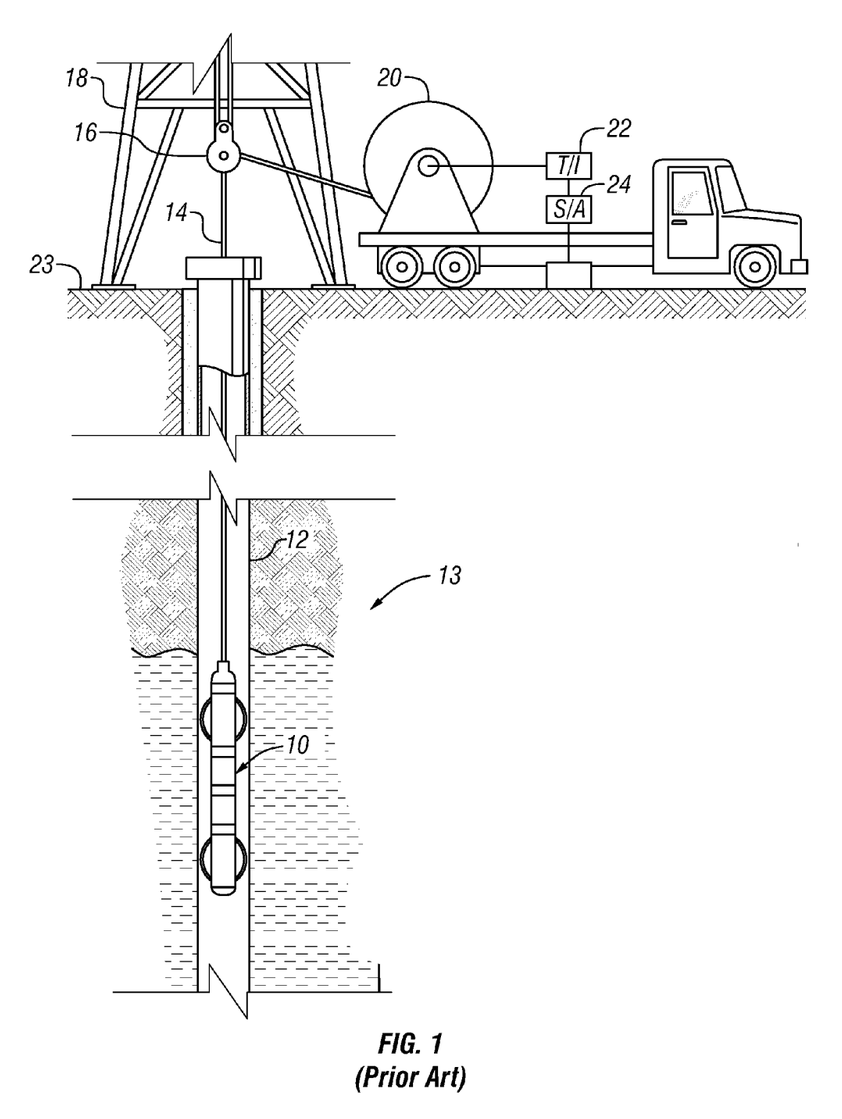
FIG. 1 (prior art) shows an exemplary logging tool suspended in a borehole.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2A:
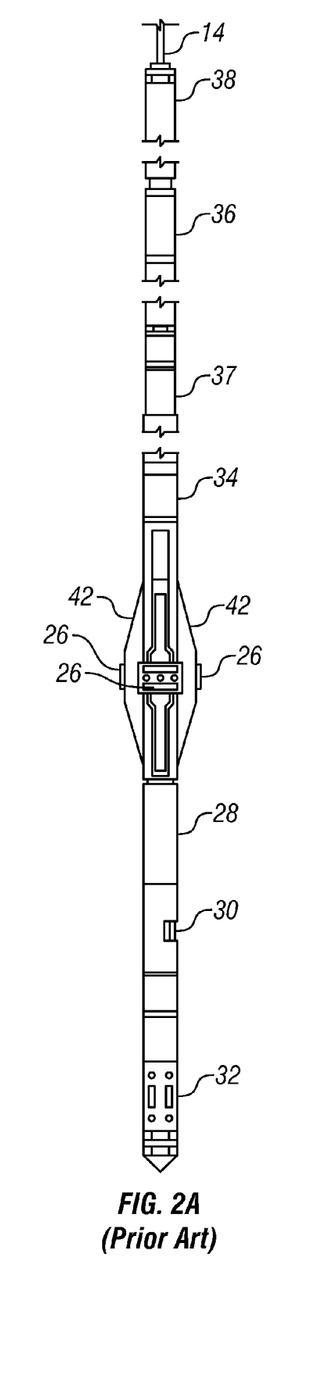
FIG. 2A (prior art) is a mechanical schematic view of an exemplary imaging tool.

FIG. 2A is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Figure 2B:
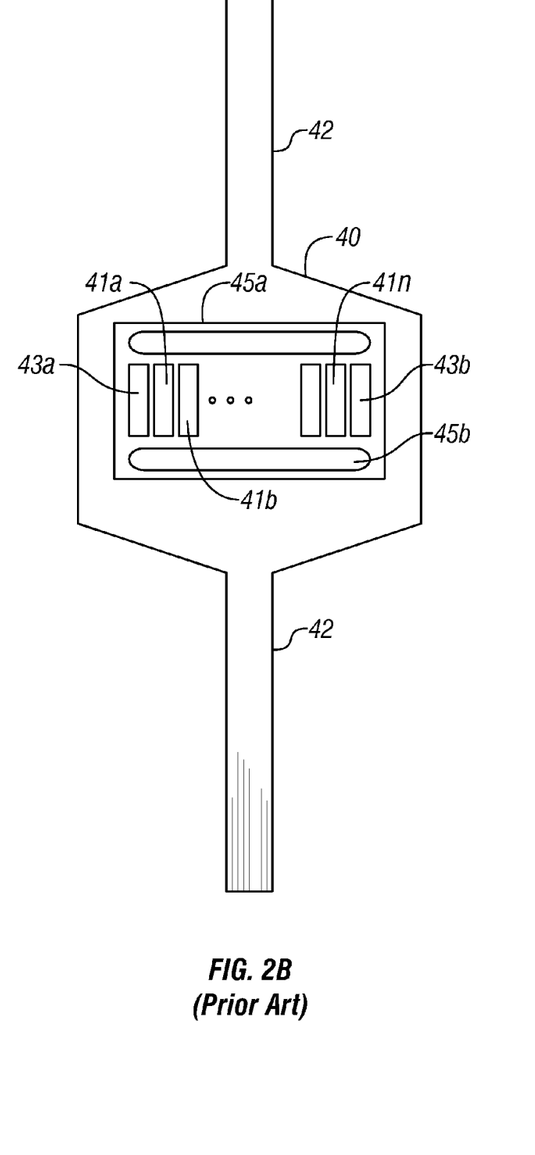
FIG. 2B (prior art) is a detail view of an electrode pad of an exemplary logging tool.

Also shown in FIG. 2A are three resistivity arrays 26 (a fourth array is hidden in this view. Referring to FIGS. 2A and 2B, each array includes measure electrodes 41a, ... 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3:
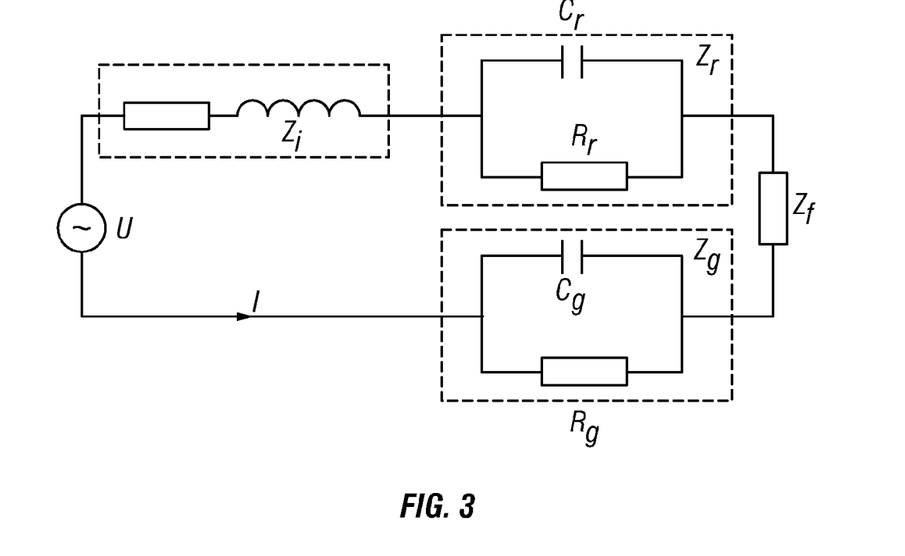
FIG. 3 is an equivalent circuit representation of a resistivity tool in a borehole.

The approximate schematic circuit diagram is presented in FIG. 3. It shows that the current in the circuit depends on the internal impedance of the tool $Z_i$, the impedance due to the standoff between return electrode and formation $Z_R$, the impedance due to the gap between receiver and formation $Z_g$ and the formation impedance $Z_f$. If U is the applied voltage then the current in the circuitry is $$I = \frac{U}{Z_i + Z_R + Z_g + Z_f}. \quad (1)$$

In its turn the formation impedance $Z_f$ is comprised of the resistivity $Z_L$ of the layer placed in the vicinity of the measurement button and some background impedance $Z_B$ which depends on resistivities of layers placed between current and return electrodes. The resolution of the impedance measurements is highly driven by the relative contribution of $Z_L$ into the measured impedance Z—the higher the contribution of $Z_L$ into the effective impedance Z compared to $Z_i$, $Z_R$, $Z_g$ and $Z_B$ the better the resolution of the measurements to the resistivity change in the vicinity of the measurement button.

Figure 4:
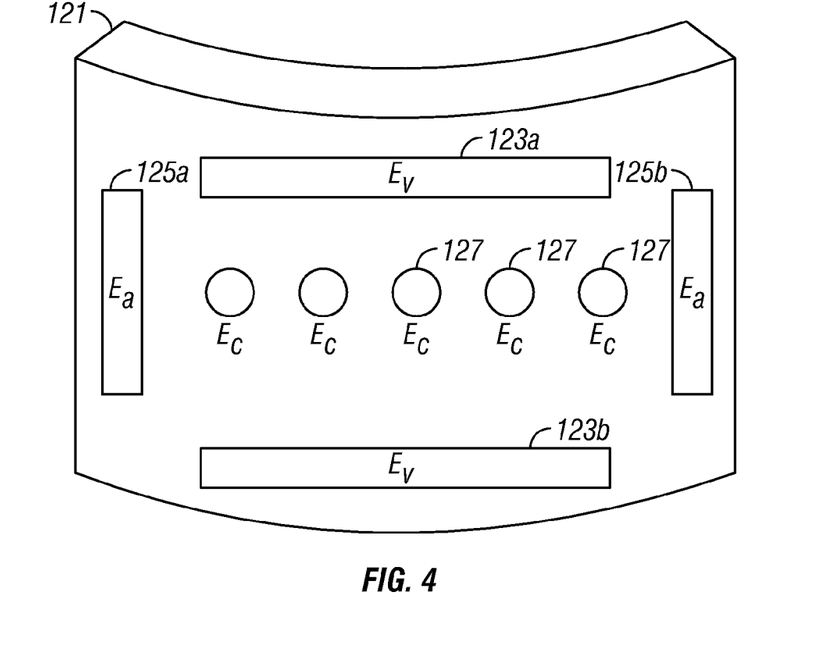
FIG. 4 is an illustration of the electrode configuration of one embodiment of the present invention.

The electrode configuration used in an embodiment of the present invention is illustrated in FIG. 4. A pad 121 is provided with a set of current electrodes 127. Also provided on the pad is a pair of vertically separated return electrodes 123a, 123b and a pair of horizontally separated return electrodes 125a, 125b. In a vertical well and horizontally laminated structure high vertical resolution is provided by the pair of two horizontally separated return electrodes 125a, 125b. The same current electrodes (buttons) in combination with the pair of vertically separated electrodes 123a, 123b provides high resolution in the azimuthal direction.

Figure 5:
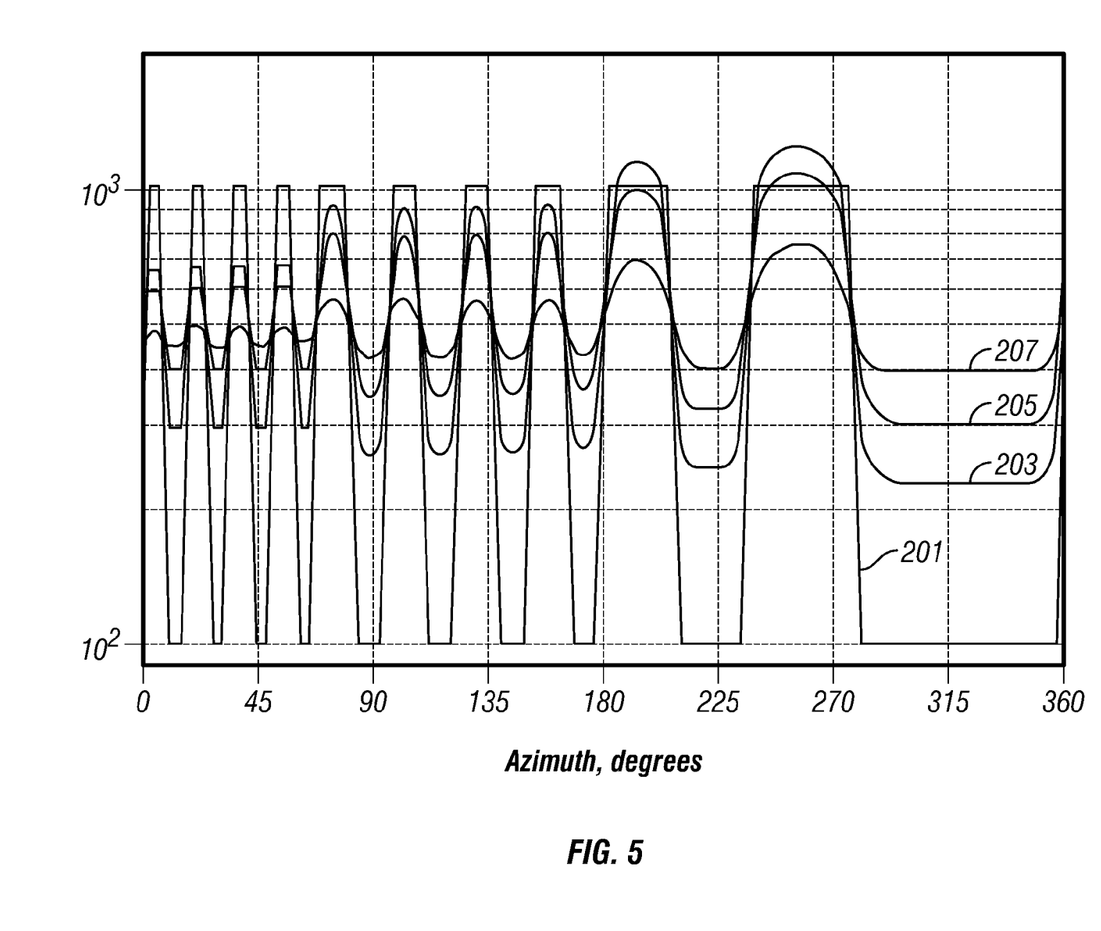
FIG. 5 is a plot showing the response of the device of FIG. 4 to a layered earth model with different tool standoffs.

FIG. 5 shows the results of 2D mathematical modeling using the electrode configuration of FIG. 4. The well diameter is 8.5 inches (21.6 cm). The well is filled with a fluid of resistivity of $10^5$ Ω-m resistive mud. The formation comprises an azimuthal sequence of layers with resistivity alternating between 1 Ω-m and 10 Ω-m. The two return electrodes 123a, 123b are separated by 10 cm. The current buttons are 0.5×0.5 in (1.27 cm×1.27 cm) and are positioned in the middle between the return electrodes. Transmitter provides an output voltage of 1V at frequency of 10 MHz. The data in FIG. 5 correspond to the different cases when the pad standoff is varying from 0 201, ⅛" (3.2 mm) 203, ¼" (6.35 m) 205, and 0.5" (1.27 cm) 207. The curves correspond to the real part of the impedance. It can be seen from FIG. 5 that the real part of impedance exactly follows formation variation (case of zero standoff). The dynamic range decreases as the standoff is increased; however, the signal has very high azimuthal resolution. It is clear, that with the horizontally separated electrodes 125a, 125b (which corresponds to rotating the electrodes 123a, 123b by 90°, the same current will have similar high resolution in the vertical direction. Similar results are noted for the imaginary part of the impedance.

In the example given above, the frequency was 10 MHz and the mud resistivity was 105 Ω-m. This is for exemplary purposes only. With resistive mud, it is generally desirable that the following relationship hold:

$$\sigma_m < \omega \epsilon_m \epsilon_0 \quad (2),$$

where $\sigma_m$ if the mud conductivity, $\omega$ is the angular frequency, $\epsilon_m$ is the relative permittivity of the mud, and $\epsilon_0$ is the permittivity of free space.

Determination of mud resistivity may be made downhole using the method and apparatus described in U.S. Pat. No. 6,803,039 to Fabris et al., having the same assignee as the present invention and the contents of which are incorporated herein by reference. The dielectric constant may be determined using the method and apparatus described in U.S. Pat. No. 5,677,631 to Reittinger et al., having the same assignee as the present invention and the contents of which are incorporated herein by reference. Alternatively, measurements of the mud resistivity and dielectric constant may be made at the surface and suitable temperature corrections applied. Based on these measurements, the frequency of operation of the tool may be selected.

It is important to note that the impedance measured in case of the vertically separated electrodes 123a, 123b depends on both horizontal and vertical resistivity of formation, while the impedance measured in case of azimuthally separated return electrodes 125a, 125 depends on horizontal resistivity only. This permits processing allowing extraction of micro anisotropy of thin laminated formation. Specifically, the data from the azimuthally separated electrodes are used to derive the horizontal resistivity at each point on the borehole wall. The resistivity determined from the vertically separated electrodes will approximately be the geometric mean of the horizontal and vertical resistivities, enabling the determination of the vertical resistivity. This is particularly useful in determining thin laminations of conductive layers that are common in areas such as the Gulf of Mexico. It should be noted that when measurements are being made with the vertically separated return electrodes, the horizontally separated returns would be open-circuited, and when measurements are made with the horizontally separated return electrodes, the vertically separated electrodes would be open-circuited.

Figure 6:
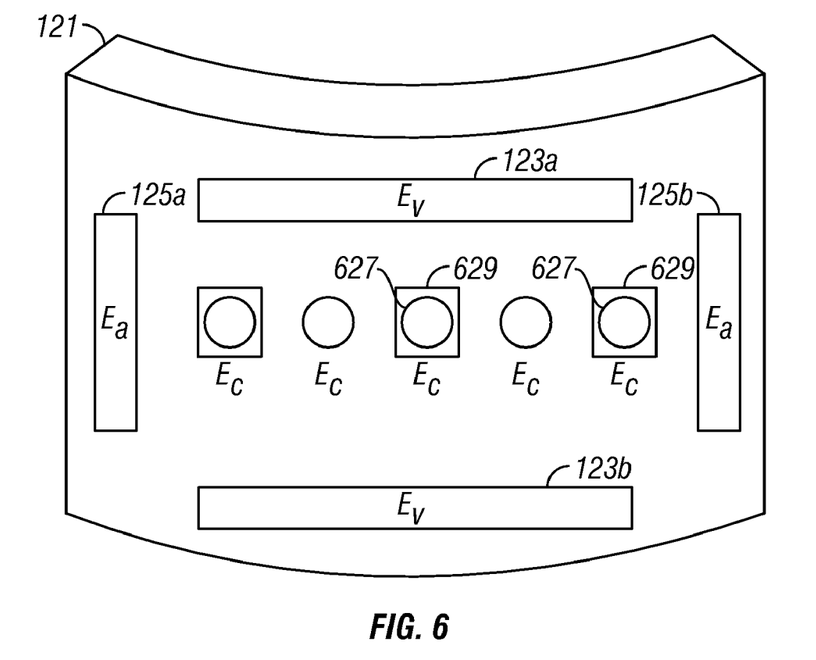
FIG. 6 is an illustration of the electrode configuration of a second embodiment of the present invention.

Turning to FIG. 6, another possible configuration of the electrodes is shown. The current electrodes 627 are surrounded by conductive surfaces 629. The conductive surface may be at a potential that is the same as or different from the potential of the current electrodes. Insulation (not shown) is provided between the electrode and the conductive surface. This makes it possible to focus the current in the formation away from any mudcake that may be present. See U.S. Pat. No. 6,348,796 to Evans having the same assignee as the present disclosure.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the invention, various modifications will be apparent to those skilled in the art. It is intended that all variations within the scope and spirit of the appended claims be embraced by the foregoing disclosure.

The following definitions may be helpful in understanding the present invention:
EAROM electrically alterable ROM;
Electrode: electric conductor, usually metal, used as either of the two terminals of an electrically conducting medium
EPROM: erasable programmable ROM;
flash memory: a nonvolatile memory that is rewritable;
induction: based on a relationship between a changing magnetic field and the electric field created by the change;
logging tool: The downhole hardware needed to make a log. The term is often shortened to simply "tool.";
machine readable medium: something on which information may be stored in a form that can be understood by a computer or a processor;
Optical disk: a disc shaped medium in which optical methods are used for storing and retrieving information;
pad: That part of a logging tool that is pressed against the borehole wall
ROM: Read-only memory;
Resistivity: electrical resistance of a conductor of unit cross-sectional area and unit length. Determination of resistivity is equivalent to determination of its inverse (conductivity).

What is claimed is:

1. An apparatus for evaluating an earth formation penetrated by a borehole, the apparatus comprising:
    (a) a pad configured to be proximate to a wall of the borehole;
    (b) a first electrode disposed on the pad, the first electrode being configured to convey a current into the earth formation;
    (c) a return electrode horizontally displaced from the first electrode; and
    (d) a processor configured to:
        (A) select a frequency of the current using a resistivity of a borehole fluid and (II) a permittivity of the borehole fluid;
        (B) determine a resistivity property of the earth formation from the current in the first electrode and a voltage between the first electrode and the return electrode, and
        (C) record the resistivity property on a suitable medium.

2. The apparatus of claim 1 wherein the pad comprises a plurality of pads.

3. The apparatus of claim 2 wherein the processor is configured to determine at least one of: (I) a real part of an impedance, and (II) an imaginary part of the impedance.

4. The apparatus of claim 2 wherein the pad is extendable from a body of a logging tool.

5. The apparatus of claim 2 wherein the return electrode further comprises a pair of return electrodes.

6. The apparatus of claim 1 wherein the first electrode further comprises a plurality of current electrodes disposed azimuthally on the pad.

7. The apparatus of claim 1 wherein the determined resistivity property comprises a horizontal resistivity of the earth formation.

8. The apparatus of claim 1 further comprising an additional return electrode vertically separated from the first electrode; and wherein the processor determines from a current in the first electrode an additional property of the earth formation.

9. The apparatus of claim 8 wherein the return electrode further comprises an open-circuited pair of electrodes.

10. The apparatus of claim 9 wherein the additional property comprises a vertical resistivity of the earth formation.

11. The apparatus of claim 1 further comprising a logging tool configured to carry the pad, and a conveyance device which configured to convey the logging tool into the borehole.

12. A method of evaluating an earth formation, the method comprising:
    (a) conveying a current into the earth formation using a pad-mounted current electrode proximate to a wall of a borehole in the formation a frequency of the current being selected using a resistivity of a borehole fluid and (II) a permittivity of the borehole fluid;
    (b) receiving the current in a return electrode horizontally separated from the current electrode;
    (c) determining a resistivity property of the earth formation from the current in the current electrode and a voltage between the current electrode and the return electrode; and
    (d) recording the determined resistivity property on a suitable medium.

13. The method of claim 12 further comprising using current electrodes on a plurality of pads.

14. The method of claim 13 wherein determining the resistivity further comprises determining at least one of: (I) a real part of an impedance, and (II) an imaginary part of the impedance.

15. The method of claim 13 further comprising positioning the plurality of current electrodes azimuthally on a pad.

16. The method of claim 13 wherein the determined resistivity property comprises a horizontal resistivity of the earth formation.

17. The method of claim 13 wherein the return electrode further comprises a first pair of return electrodes, the method further comprising:
   (i) open-circuiting the first pair of return electrodes,
   (ii) positioning a second pair of vertically separated return electrodes on the at least one pad; and
   (iii) determining from currents from the current electrodes an additional property of the earth formation.

18. The method of claim 17 wherein the additional property comprises a vertical resistivity of the earth formation.

19. The method of claim 18 further comprising selecting a frequency of the current using at least one of (i) a conductivity of a fluid in a borehole, and (ii) a permittivity of a fluid in a borehole.

20. A computer readable medium for use with an apparatus for evaluating an earth formation penetrated by a borehole, the apparatus comprising:
   (a) at least one pad conveyed in a borehole the at least one pad proximate to a wall of the borehole;
   (b) at least one current electrode disposed on the at least one pad, the at least one current electrode configured to convey a current into the earth formation a frequency of the current being selected using a resistivity of a borehole fluid and (II) a permittivity of the borehole fluid; and
   (c) at least one return electrode horizontally displaced from the at least one current electrode;
   the medium comprising instructions that enable a processor to determine a resistivity property of the earth formation from the current in the at least one current electrode and a voltage between the at least one current electrode and the at least one return electrode.

21. The medium of claim 20 further comprising at least one of (i) a ROM, (ii) an EPROM, (iii) an EAROM, (iv) a flash memory, and (v) an optical disk.

* * * * *

UNITED STATES PATENT AND TRADEMARK OFFICE
CERTIFICATE OF CORRECTION

PATENT NO. : 7,612,567 B2
APPLICATION NO. : 12/110792
DATED : November 3, 2009
INVENTOR(S) : Gregory B. Itskovich et al.

It is certified that error appears in the above-identified patent and that said Letters Patent is hereby corrected as shown below:

Column 2, line 24, delete "a resistivity", insert --(I) a resistivity--;

Column 2, line 41, delete "includes a a", insert --includes a--;

Column 6, claim 1, line 9, delete "using a resistivity", insert --using (I) a resistivity--;

Column 6, claim 11, line 43, delete "which";

Column 6, claim 12, line 49, delete "formation a", insert --formation, a--;

Column 6, claim 12, line 50, delete "using a resistivity", insert --using (I) a resistivity--;

Column 6, claim 14, line 63, delete "further", insert --property further--;

Column 7, claim 19, line 16, delete "permittivity of a", insert --permittivity of the--;

Column 8, claim 20, line 1, delete "borehole the", insert --borehole, the--;

Column 8, claim 20, line 5, delete "formation a", insert --formation, a--; and

Column 8, claim 20, line 6, delete "using a", insert --using (I) a--.

Signed and Sealed this

First Day of December, 2009

David J. Kappos
*Director of the United States Patent and Trademark Office*